United States Patent
Wakao et al.

(10) Patent No.: US 9,315,645 B2
(45) Date of Patent: Apr. 19, 2016

(54) AQUEOUS POLY(METH)ACRYLIC ACID (SALT) SOLUTION AND PROCESS FOR PREPARING SAME

(75) Inventors: Norihiro Wakao, Osaka (JP); Akihiko Kanzaki, Osaka (JP); Junichi Chosa, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 38 days.

(21) Appl. No.: 13/991,967

(22) PCT Filed: Dec. 21, 2011

(86) PCT No.: PCT/JP2011/079708
§ 371 (c)(1),
(2), (4) Date: Jun. 6, 2013

(87) PCT Pub. No.: WO2012/086716
PCT Pub. Date: Jun. 28, 2012

(65) Prior Publication Data
US 2013/0261257 A1    Oct. 3, 2013

(30) Foreign Application Priority Data

Dec. 21, 2010   (JP) ................. 2010-284162

(51) Int. Cl.
| | | |
|---|---|---|
| C08K 3/30 | (2006.01) | |
| C08F 2/44 | (2006.01) | |
| C08F 20/06 | (2006.01) | |
| C08K 5/49 | (2006.01) | |
| C08K 5/52 | (2006.01) | |
| C09C 3/10 | (2006.01) | |
| C09D 7/02 | (2006.01) | |
| C08K 3/32 | (2006.01) | |

(52) U.S. Cl.
CPC ... *C08K 3/30* (2013.01); *C08F 2/44* (2013.01); *C08F 20/06* (2013.01); *C08K 3/32* (2013.01); *C08K 5/49* (2013.01); *C08K 5/52* (2013.01); *C09C 3/10* (2013.01); *C09D 7/02* (2013.01); *C01P 2006/22* (2013.01)

(58) Field of Classification Search
CPC .............................. C08K 2003/329
USPC ............................ 524/710, 711
See application file for complete search history.

(56) References Cited

U.S. PATENT DOCUMENTS

| | | | |
|---|---|---|---|
| 4,840,985 A | 6/1989 | Gonnet et al. | |
| 5,077,361 A | 12/1991 | Hughes et al. | |
| 5,216,099 A | 6/1993 | Hughes et al. | |
| 5,256,746 A * | 10/1993 | Blankenship et al. | 526/233 |
| 5,294,686 A * | 3/1994 | Fiarman et al. | 526/233 |
| 5,294,687 A * | 3/1994 | Blankenship et al. | 526/233 |
| 5,866,678 A * | 2/1999 | Kajikawa et al. | 528/487 |
| 6,297,336 B1 * | 10/2001 | Shioji et al. | 526/317.1 |
| 6,627,681 B1 * | 9/2003 | Ueda et al. | 523/343 |
| 2002/0019329 A1 | 2/2002 | Hemmi et al. | |
| 2004/0127660 A1 * | 7/2004 | Fukuhara et al. | 526/240 |
| 2005/0113541 A1 * | 5/2005 | Tsumori et al. | 526/317.1 |
| 2009/0298988 A1 | 12/2009 | Jacquemet et al. | |
| 2009/0306266 A1 | 12/2009 | Creamer et al. | |
| 2012/0059106 A1 | 3/2012 | Creamer et al. | |
| 2012/0302689 A1 | 11/2012 | Jacquemet et al. | |
| 2013/0090425 A1 * | 4/2013 | Wakao et al. | 524/556 |
| 2013/0261257 A1 * | 10/2013 | Wakao et al. | 524/706 |
| 2014/0235794 A1 * | 8/2014 | Yamaguchi | 525/328.5 |

FOREIGN PATENT DOCUMENTS

| | | |
|---|---|---|
| CN | 1068830 | 2/1993 |
| EP | 0 405 818 | 1/1991 |
| EP | 0 510 831 | 10/1992 |
| EP | 0 792 890 | 9/1997 |
| EP | 1 074 293 | 2/2001 |
| JP | 54-82416 | 6/1979 |
| JP | 59-47265 | 3/1984 |
| JP | 3-121101 | 5/1991 |
| JP | 6-263803 | 9/1994 |
| JP | 6-287208 | 10/1994 |
| JP | 10-1512 | 1/1998 |
| JP | 11-241066 | 9/1999 |
| JP | 2000-80396 | 3/2000 |
| JP | 2000-198809 | 7/2000 |
| JP | 2000-239595 | 9/2000 |
| JP | 2000-281959 | 10/2000 |
| JP | 2002-80502 | 3/2002 |
| JP | 2002-179704 | 6/2002 |
| JP | 2002-179933 | 6/2002 |
| JP | 2003-236359 | 8/2003 |
| JP | 2003-277409 | 10/2003 |
| JP | 2005-139469 | 6/2005 |
| JP | 2009-522189 | 6/2009 |
| JP | 2009-242598 | 10/2009 |
| JP | 2009-242784 | 10/2009 |
| JP | 2011-21130 | 2/2011 |
| WO | 2011/158945 | 12/2011 |

OTHER PUBLICATIONS

International Search Report issued Apr. 3, 2012 in International (PCT) Application No. PCT/JP2011/079708.

* cited by examiner

*Primary Examiner* — Michael A Salvitti
(74) *Attorney, Agent, or Firm* — Wenderoth, Lind & Ponack, L.L.P.

(57) ABSTRACT

An object of the present invention is to provide an aqueous poly(meth)acrylic acid (salt) solution having high dispersibility of inorganic substances and demonstrating dispersibility having sufficient stability over time, and a process for preparing the same.
The present invention relates to an aqueous poly(meth)acrylic acid (salt) solution comprising a poly(meth)acrylic acid (salt) having a weight average molecular weight of 1000 to 10000 polymerized in the presence of a phosphorus compound containing hypophosphorous acid (salt), wherein the phosphorus compound contains 0 to 0.3% by mass of a phosphorous acid (salt) based on 100% by mass of the phosphorus compound, and the aqueous poly(meth)acrylic acid (salt) solution contains 0 to 10000 ppm of an inorganic anion and a process for the preparation thereof.

11 Claims, No Drawings

AQUEOUS POLY(METH)ACRYLIC ACID (SALT) SOLUTION AND PROCESS FOR PREPARING SAME

TECHNICAL FIELD

The present invention relates to an aqueous poly(meth) acrylic acid (salt) solution and a process for preparing the same. More specifically, the present invention relates to an aqueous poly(meth)acrylic acid (salt) solution having high dispersibility and dispersibility over time of inorganic particles and the like.

BACKGROUND ART

Carboxyl group-containing polymers such as sodium poly (meth)acrylate are widely used in applications of detergent builders, pigment dispersants (dispersants for inorganic particles), and water treatment agents (anti-deposition agents for preventing deposition of a scale component), for example. These markets have demanded the polymer having higher performance.

Methods for filling such needs include a method of producing a polymer disclosed in Patent Literature 1 in which a chain transfer agent is continuously added for a predetermined period during polymerization wherein an addition rate of the chain transfer agent is changed at least once. In the disclosure, this method can reduce the amount of the remaining monomer to improve the safety of the polymer to be obtained. Moreover, the concentration of the monomer in the reaction solution can be further increased to improve the productivity of the polymer and produce the polymer at low cost. Further, the polymer to be obtained can have narrower molecular weight distribution, and demonstrate high performance (such as dispersion performance) when the polymer is used as a detergent builder or an inorganic pigment dispersant, for example. Patent Literature 1 also discloses use of sodium hypophosphite as the chain transfer agent.

Moreover, for example, Patent Literature 2 discloses a calcium carbonate aqueous suspension containing at least one co-grinding agent comprising at least one homopolymer and/or at least one copolymer of a partially neutralized acrylic acid whose molar neutralization rate of acid functional groups is less than 75% of the total acid functional groups.

Moreover, for example, Patent Literature 3 discloses a process of polymerizing or copolymerizing acrylate monomers to form low molecular weight water-soluble acrylate polymers using a hypophosphorous acid chain transfer agent together with polymerization initiators, water and optional polymerization activators in a heated, agitated aqueous polymerizing mixture containing the monomers, the process comprising concurrently feeding hypophosphorous acid chain transfer agent and an alkaline neutralizer to the polymerizing mixture of monomers such that the alkaline neutralizer is present during at least most, if not all, of the polymerization in an amount sufficient to neutralize at least 20% of the acid groups of the carboxylic monomers present. In the disclosure, according to the polymerization process, a low molecular water soluble polycarboxylate polymer composition with high levels of dialkyl phosphinate polymers and low levels of unreacted or unincorporated hypophosphite or phosphite inorganic compounds where greater than 50% of the phosphorus present is in the dialkyl species and less than 20% is in inorganic phosphorus containing acids or salts is obtained. Moreover, Patent Literature 3 discloses a composition having a large content of a dialkyl polymer and a low content of an inorganic compound which is useful in end-use applications such as dispersants for paint blended products, additives for washing detergents and detergents for dish washers, dispersants for kaolin clay slurries and anti-scale agents, dispersants for water treatments and oil production, and corrosion inhibitors.

Moreover, for example, Patent Literature 4 discloses a detergent builder containing a poly(meth)acrylic acid (salt) polymer as an essential component wherein a product of an anti-gelation ability (A) and a chelating ability (B) (A×B) is not less than 18,000. Patent Literature 4 discloses a detergent builder obtained using a polymer having narrower molecular weight distribution, a high anti-gelation ability, and a high chelating ability.

CITATION LIST

Patent Literature

Patent Literature 1: JP 2002-179704A
Patent Literature 2: JP 2009-522189T
Patent Literature 3: JP 3-121101A
Patent Literature 4: JP 2000-80396A

SUMMARY OF INVENTION

Technical Problem

Technical fields using aqueous poly(meth)acrylic acid polymer solutions these days have increasingly demanded more sophisticated and precise coating techniques using pigment coaters, for example. To meet such demands, it is found that a technical problem needs to be solved, that is, the conventional poly(meth)acrylic acid polymer in the aqueous solution needs to be replaced by a polymer demonstrating a pigment dispersion ability higher than that of the conventional poly(meth)acrylic acid polymer, especially dispersibility whose change over time is smaller than that of the conventional poly(meth)acrylic acid polymer. In the related art, various polymers as above are disclosed, but these polymers cannot yet sufficiently demonstrate dispersibility with little change over time that can solve the above problem.

The present invention has been made in consideration of such circumstance. An object of the present invention is to provide a polymer aqueous solution having high dispersibility of inorganic substances and demonstrating dispersibility having sufficient stability over time, and a simple process for preparing the polymer aqueous solution.

Solution to Problem

The present inventors conducted extensive research to solve the problem above. As a result, it was found out that for a poly(meth)acrylic acid (salt) polymerized in the presence of hypophosphorous acid (salt) having a small content of phosphorous acid (salt), the total amount of ions contained after polymerization can be reduced more than that in a poly(meth) acrylic acid (salt) polymerized in the presence of hypophosphorous acid (salt) having a large content of phosphorous acid (salt); as a result, dispersion performance improves. It was also found out that an aqueous solution containing a specific poly(meth)acrylic acid (salt) demonstrates high dispersibility of inorganic substances and dispersibility having sufficient stability over time. Thus, the present invention has been completed.

Namely, the present invention relates to an aqueous poly (meth)acrylic acid (salt) solution comprising a poly(meth) acrylic acid (salt) having a weight average molecular weight of 1000 to 10000 polymerized in the presence of a phosphorus compound containing hypophosphorous acid (salt), wherein the phosphorus compound contains 0 to 0.3% by mass of a phosphorous acid (salt) based on 100% by mass of the phosphorus compound, and the aqueous poly(meth)acrylic acid (salt) solution contains 0 to 10000 ppm of an inorganic anion.

A second aspect of the aqueous solution according to the present invention is an aqueous poly(meth)acrylic acid (salt) solution containing a poly(meth)acrylic acid (salt) having a weight average molecular weight of 1000 to 10000 polymerized in the presence of a phosphorus compound containing hypophosphorous acid (salt), wherein the phosphorus compound contains 0 to 0.3% by mass of a phosphorous acid (salt) based on 100% by mass of the phosphorus compound; and the aqueous poly(meth)acrylic acid (salt) solution contains 0 to 10000 ppm of an inorganic anion; and the aqueous poly(meth)acrylic acid (salt) solution has a pH of not less than 4.0 and not more than 8.0.

The present invention also relates to a process for preparing an aqueous poly(meth)acrylic acid (salt) solution. Namely, the process for preparing an aqueous poly(meth)acrylic acid (salt) solution according to the present invention is a process for preparing an aqueous poly(meth)acrylic acid (salt) solution comprising the step of polymerizing a monomer in an aqueous solvent in the presence of a phosphorus compound containing hypophosphorous acid (salt), wherein the monomer contains (meth)acrylic acid (salt) as an essential component; the phosphorus compound contains 0 to 0.3% by mass of a phosphorous acid (salt) based on 100% by mass of the phosphorus compound; the poly(meth)acrylic acid (salt) has a weight average molecular weight of 1000 to 10000; and the aqueous poly(meth)acrylic acid (salt) solution contains 0 to 10000 ppm of an inorganic anion.

Further, the present invention relates to a dispersant. Namely, the dispersant according to the present invention is a dispersant comprising an aqueous poly(meth)acrylic acid (salt) solution containing a poly(meth)acrylic acid (salt) having a weight average molecular weight of 1000 to 10000 polymerized in the presence of a phosphorus compound containing hypophosphorous acid (salt), wherein the phosphorus compound contains 0 to 0.3% by mass of a phosphorous acid (salt) based on 100% by mass of the phosphorus compound; and the aqueous poly(meth)acrylic acid (salt) solution contains 0 to 10000 ppm of an inorganic anion.

Moreover, the present invention relates to an inorganic particle dispersion. Namely, the inorganic particle dispersion according to the present invention is an inorganic particle dispersion containing not less than 70% by mass of an inorganic particle, and prepared by a process comprising the step of adding an aqueous poly(meth)acrylic acid (salt) solution, and grinding the inorganic particle, wherein the aqueous poly(meth)acrylic acid (salt) solution contains a poly(meth)acrylic acid (salt) having a weight average molecular weight of 1000 to 10000 polymerized in the presence of a phosphorus compound containing hypophosphorous acid (salt); the phosphorus compound contains 0 to 0.3% by mass of a phosphorous acid (salt) based on 100% by mass of the phosphorus compound; and the aqueous poly(meth)acrylic acid (salt) solution contains 0 to 10000 ppm of an inorganic anion.

Advantageous Effects of Invention

The aqueous poly(meth)acrylic acid (salt) solution according to the present invention contains a poly(meth)acrylic acid (salt) polymerized using a phosphorus compound having a small content of phosphorous acids (salts). Thereby, the amount of inorganic ions derived from the unreacted phosphorus compound can be reduced. As a result, the aqueous poly(meth)acrylic acid (salt) solution can demonstrate high dispersibility of dirt and inorganic particles such as inorganic pigments and dispersibility having sufficient stability over time. Consequently, the aqueous poly(meth)acrylic acid (salt) solution, when used as a detergent builder or a dispersant for inorganic particles, can attain high washing performance and dispersibility of inorganic particles having stability over time. The aqueous poly(meth)acrylic acid (salt) solution according to the present invention also has a good color tone.

DESCRIPTION OF EMBODIMENTS

Hereinafter, the present invention will be specifically described.

Preferred embodiments according to the present invention include a combination of two or more of the preferable embodiments according to the present invention described below.

[Poly(Meth)Acrylic Acid (Salt)]

The aqueous solution according to the present invention includes a poly(meth)acrylic acid (salt) (also referred to as the poly(meth)acrylic acid (salt) according to the present invention or the polymer according to the present invention).

In the present invention, the poly(meth)acrylic acid (salt) refers to a polymer including a structure derived from a (meth)acrylic acid (salt). The structure derived from a (meth)acrylic acid (salt) is a structure formed by radical polymerization of the (meth)acrylic acid (salt) and represented by —$CH_2CR(COOM)$—. In the structure, R represents a hydrogen atom or a methyl group, and M represents a hydrogen atom, an alkali metal atom such as Li, Na, K, an alkaline earth metal atom such as Ca and Mg, an ammonium salt, or an organic amine salt.

In the present invention, the (meth)acrylic acid (salt) means acrylic acid, acrylic acid salts, methacrylic acid, and methacrylic acid salts. Examples of salts include alkali metal salts such as Li, Na, and K; alkaline earth metal salts such as Ca and Mg; ammonium salts; organic amine salts and the like.

The poly(meth)acrylic acid (salt) according to the present invention may have only the structure derived from (meth)acrylic acid (salt), or may include a structure derived from other monomer copolymerizable with the (meth)acrylic acid (salt).

Examples of the other monomer specifically include carboxyl group-containing monomers other than (meth)acrylic acid such as maleic acid, fumaric acid, itaconic acid, crotonic acid, 2-methyleneglutaric acid, and salts thereof; hydroxyl group-containing alkyl(meth)acrylates such as 2-hydroxyethyl(meth)acrylate, 2-hydroxypropyl(meth)acrylate, 3-hydroxypropyl(meth)acrylate, 2-hydroxybutyl(meth)acrylate, 4-hydroxybutyl(meth)acrylate, and α-hydroxymethylethyl (meth)acrylate; alkyl(meth)acrylates such as methyl(meth)acrylate, ethyl(meth)acrylate, butyl (meth)acrylate, cyclohexyl(meth)acrylate, and lauryl(meth)acrylate, which are esters of (meth)acrylic acids and an alkyl group having 1 to 18 carbon atoms; amino group-containing acrylates such as dimethyl aminoethyl(meth)acrylate or quaternized products thereof; amide group-containing monomers such as (meth)acrylamide, dimethyl acrylamide, and isopropyl acrylamide; vinyl esters such as vinyl acetate; alkenes such as ethylene and propylene; aromatic vinyl monomers such as styrene; maleimide derivatives such as maleimide, phenyl maleimide, and cyclohexyl maleimide; nitrile group-containing vinyl monomers such as (meth)acrylonitrile; monomers having a sulfonic acid group such as 3-allyloxy-2-hydroxypropanesulfonic acid, 2-acrylamide-2-methylpropanesulfonic acid, styrenesulfonic acid, and vinylsulfonic acid and salts thereof; monomers having a phosphonic acid group such as vinylphosphonic acid and (meth)allylphosphonic acid; aldehyde group-containing vinyl monomers such as (meth)acrolein; alkyl vinyl ethers such as methyl vinyl ether, ethyl vinyl ether, and butyl vinyl ether; monomers containing other functional groups such as vinyl chloride, vinylidene chloride, allyl alcohol, and vinylpyrrolidone; and polyalkylene glycol chain-containing monomers such as polyalkylene glycol (meth)acrylate, monoalkoxy polyalkylene glycol(meth)acrylate, and, monomers having a structure in which 1 to 300 mol of alkylene oxide is added to an unsaturated alcohol such as vinyl alcohol, (meth)allyl alcohol, and isoprenol. These other monomers may be used alone, or two or more thereof may be used in combination.

Preferably, the poly(meth)acrylic acid (salt) according to the present invention includes not less than 90% by mass and not more than 100% by mass of the structure derived from a (meth)acrylic acid (salt) in terms of acid type based on 100% by mass of the structures derived from all the monomers contained in the poly(meth)acrylic acid (salt) according to the present invention (namely, the total of the structure derived from the (meth)acrylic acid (salt) and the structure derived from the other monomer). If the ratio of the structure derived from the (meth)acrylic acid (salt) included is not less than 90% by mass, the composition tends to have improved dispersion performance over time of inorganic particles (pigments).

Here, "in terms of acid type" means that the mass proportion of a salt type monomer is calculated considering the salt type monomer as the corresponding acid type monomer. For example, for the structure derived from sodium(meth)acrylate, the mass proportion of the structure derived from sodium (meth)acrylate is calculated considering the structure derived from sodium(meth)acrylate as the structure derived from (meth)acrylic acid. For the other monomer, the mass proportion is also calculated in the same manner in terms of acid type.

In the poly(meth)acrylic acid (salt) according to the present invention, the mass proportion of the structure derived from the other monomer is preferably 0 to 10% by mass based on 100% by mass of the structures derived from all the monomers contained in the poly(meth)acrylic acid (salt) according to the present invention.

The poly(meth)acrylic acid (salt) according to the present invention preferably includes the structure derived from the (meth)acrylic acid and the structure derived from a (meth) acrylic acid salt.

The molar proportion of the structure derived from a (meth)acrylic acid is preferably 1 to 90 mol %, more preferably 1.5 to 85 mol %, and still more preferably 2 to 80 mol % based on 100 mol % of the structures derived from all the monomers (namely, the structure derived from the (meth) acrylic acid (salt) and the structure derived from the other monomer) included in the poly(meth)acrylic acid (salt) according to the present invention. The molar proportion set within the range of 1 to 90 mol % improves the stability over time of the viscosity of a dispersion (hereinafter, also referred to as a slurry) when the aqueous poly(meth)acrylic acid (salt) solution according to the present invention is used for the inorganic particle dispersion, and attains a good color tone of the aqueous poly(meth)acrylic acid (salt) solution.

The structure derived from (meth)acrylic acid is the structure represented by —CH$_2$CR(COOH)— (R represents H or CH$_3$). The structure includes no structure in which a carboxyl group is a salt. For example, when acrylic acid is polymerized, and then the carboxyl group is neutralized, the structure is the structure derived from an acrylic acid salt, which is not included in the structure derived from acrylic acid in the present invention.

The molar proportion of the structure derived from a (meth)acrylic acid salt is preferably 10 to 99 mol %, more preferably 15 to 98.5 mol %, and particularly preferably 20 to 98 mol % based on 100 mol % of the structures derived from all the monomers included in the poly(meth)acrylic acid (salt) according to the present invention. The molar proportion set within the range of 10 to 99 mol % improves the stability over time of the viscosity of the slurry when the aqueous poly (meth)acrylic acid (salt) solution according to the present invention is used for the inorganic particle dispersion.

In the present invention, the structure derived from a (meth) acrylic acid salt is the structure formed by radical polymerization of a (meth)acrylic acid salt as described above, but is not limited to the structure of a (meth)acrylic acid salt actually polymerized. The structure derived from a (meth)acrylic acid salt includes, for example, the structure obtained when a (meth)acrylic acid is polymerized, and the carboxyl group (acrylic acid group) is neutralized with a suitable base to form a salt of the carboxyl group. Namely, for the structure derived from an alkali metal salt of (meth)acrylic acid, irrespective of raw materials and the production method, the structure derived from an alkali metal salt of (meth)acrylic acid is the structure represented by —CH$_2$CR(COOM$_1$)— (R represents H or CH$_3$, and M$_1$ represents an alkali metal atom such as Li, Na, and K).

The poly(meth)acrylic acid (salt) according to the present invention preferably contains (has) a phosphorus-containing group because molecular weight distribution is narrowed and the ability over time to disperse inorganic particles improves. The phosphorus-containing group can be introduced into the molecule by using a phosphorus-containing compound such as hypophosphorous acid (salt) as a chain transfer agent, for example, as described later.

Examples of the phosphorus-containing group include a phosphinate group, a phosphonate group, and a phosphoric acid ester group. The phosphinate group (—PH(=O)(ONa), —P(=O)(ONa)—) is particularly preferable because the dispersion ability over time particularly improves.

The phosphorus-containing group introduced into the poly (meth)acrylic acid (salt) can be measured by $^{31}$P-NMR analysis, for example. The poly(meth)acrylic acid (salt) according to the present invention contains preferably 1 to 10% by mass, and more preferably 1.5 to 8.0% by mass of the phosphorus-containing group in terms of acid type based on 100% by mass of the poly(meth)acrylic acid (salt) because the ability over time to disperse inorganic particles improves.

In the poly(meth)acrylic acid (salt) according to the present invention, the structure derived from (meth)acrylic acid (salt) is preferably the structure derived from acrylic acid (salt).

The weight average molecular weight of the poly(meth) acrylic acid (salt) according to the present invention is specifically 1000 to 20000, preferably 1000 to 10000, and more preferably 2000 to 9000. If the value of the weight average molecular weight is within the range above, the dispersibility of clay, inorganic particles, and the like tends to improve. The weight average molecular weight can be controlled by changing the amount of the chain transfer agent and the polymerization temperature, or the like.

The value of the weight average molecular weight of the poly(meth)acrylic acid (salt) according to the present invention is the value measured according to the method described in Examples described later.

The molecular weight distribution (weight average molecular weight (Mw)/number average molecular weight (Mn)) of the poly(meth)acrylic acid (salt) according to the present invention is, specifically, preferably 1.1 to 3.0, more preferably 1.5 to 2.8, and still more preferably 1.8 to 2.6.

At a value of the molecular weight distribution less than 1.1, the viscosity of the slurry immediately after grinding may increase when the poly(meth)acrylic acid (salt) is used as a dispersant for inorganic substances, for example, and the inorganic substances is ground by a wet method. At a value more than 3.0, the stability over time of the viscosity of the slurry may reduce.

The value of the molecular weight distribution of the poly(meth)acrylic acid (salt) according to the present invention is a value measured by the method described in Examples described later.

[Aqueous Poly(Meth)Acrylic Acid (Salt) Solution]

The polymer (poly(meth)acrylic acid (salt)) aqueous solution according to the present invention contains the poly(meth)acrylic acid (salt) according to the present invention as an essential component. Besides, the unreacted (meth)acrylic acid (salt), the unreacted other monomer, the unreacted polymerization initiator, the decomposed polymerization initiator, and the like may be contained.

The content of the unreacted monomer existing in the polymer aqueous solution (total content of the (meth)acrylic acid (salt) and the other monomer) varies depending on the kind of the monomer to be used. The content is preferably less than 1% by mass based on 100% by mass of the solid content in the polymer aqueous solution. The content is more preferably less than 0.5% by mass, and still more preferably less than 0.1% by mass.

The aqueous poly(meth)acrylic acid (salt) solution according to the present invention is not particularly limited, and may be a solution produced by producing a poly(meth)acrylic acid (salt) in an aqueous solvent described later, and performing a refining step of removing impurities or the like. From the viewpoint of production efficiency, a solution obtained without performing the refining step is preferable. Further, the aqueous poly(meth)acrylic acid (salt) solution according to the present invention includes those obtained by diluting the obtained polymer aqueous solution with a small amount of water after the polymerization step for easy handling or the like (adding approximately 1 to 400% by mass of water to 100% by mass of the obtained polymer aqueous solution), and those obtained by condensing the obtained polymer aqueous solution.

Besides the poly(meth)acrylic acid (salt) according to the present invention, the aqueous poly(meth)acrylic acid (salt) solution according to the present invention contains a solvent containing water as an essential component. In this case, the content of the solvent is preferably approximately 50 to 500% by mass, more preferably approximately 60 to 400% by mass, still more preferably approximately 80 to 300% by mass, and most preferably approximately 90 to 200% by mass based on 100% by mass of the poly(meth)acrylic acid (salt).

As described later, in order not to limit the usage of the aqueous poly(meth)acrylic acid (salt) solution or from the viewpoint of improvement in performance, the content of an organic solvent is preferably minimized. For example, the content of the organic solvent is preferably not more than 10% by mass, more preferably not more than 5% by mass, and still more preferably not more than 1% by mass based on 100% by mass of the aqueous poly(meth)acrylic acid (salt) solution.

The aqueous poly(meth)acrylic acid (salt) solution according to the present invention has a concentration (content) of the inorganic anion of 0 to 10000 ppm based on the aqueous solution. At a concentration of the inorganic anion more than 10000 ppm, the performance over time of the polymer aqueous solution to disperse inorganic particles tends to reduce. As described later, the concentration of the inorganic anion can be controlled within the range above by adjusting the polymerization condition or raw materials. The concentration of the inorganic anion can be measured by an analysis by ion chromatography.

The concentration of the inorganic anion is preferably 0 to 9000 ppm, more preferably 0 to 8000 ppm, and still more preferably 0 to 7000 ppm.

Examples of the inorganic anion include ions including a sulfur atom such as sulfuric acid ion and sulfurous acid ion; and ions including a phosphorus atom such as phosphoric acid ions, phosphorous acid ions, and hypophosphorous acid ion.

Preferably, the polymer aqueous solution is controlled to have the concentration of the inorganic anion including a sulfur atom or phosphorus atom within the range above when an effective component value described later is adjusted to 35 to 45% by mass.

The poly(meth)acrylic acid (salt) according to the present invention is polymerized in the presence of a phosphorus compound containing hypophosphorous acid (salt). For this reason, the aqueous poly(meth)acrylic acid (salt) solution according to the present invention may contain an inorganic anion including a phosphorus atom such as a residue of the phosphorus compound. The concentration (content) of the inorganic anion including a phosphorus atom is preferably 0 to 6000 ppm, more preferably 0 to 5500 ppm, and still more preferably 0 to 5000 ppm based on the aqueous solution.

The poly(meth)acrylic acid (salt) polymerized in the presence of a phosphorus compound containing hypophosphorous acid (salt) represents a (meth)acrylic acid (salt) produced by a preparation process comprising the step of polymerizing a monomer containing a (meth)acrylic acid (salt) as an essential component in the presence of a phosphorus compound containing hypophosphorous acid (salt).

The phosphorus compound in the present invention represents hypophosphorous acid (salt) and phosphorous acid (salt). Hypophosphorous acid (salt) and phosphorous acid (salt) may exist in the form of a hydrate.

In the phosphorus compound containing hypophosphorous acid (salt) in the present invention, the content of phosphorous acid (salt) is 0 to 0.3% by mass based on 100% by mass of the phosphorus compound.

The mass of phosphorous acid (salt) is calculated considering phosphorous acid (salt) as sodium phosphite (in terms of sodium salt). When the phosphorus compound also has an acid group, the mass of phosphorous acid (salt) is calculated considering phosphorous acid (salt) as a sodium salt. Hydrated water is excluded from the calculation. For example, the mass of calcium phosphite monohydrate is calculated considering calcium phosphite monohydrate as disodium phosphite.

In the present invention, the content of phosphorous acid (salt) based on 100% by mass of the phosphorus compound is the content of phosphorous acid (salt) based on 100% by mass of the phosphorus compound at the time of the polymerization of the monomer containing (meth)acrylic acid (salt) as an essential component in the presence of a phosphorus compound containing hypophosphorous acid (salt), in particular, at the time of the addition of the phosphorus compound into a reaction tank (container).

As described later, in the case where the phosphorus compound as the raw material containing a small content of phosphorous acid (salt) is used, or the phosphorus compound is used in a form of an aqueous solution, the phosphorous compound is used within 72 hours after the aqueous solution thereof is prepared, or deoxidation is performed. Thereby, the content of phosphorous acid (salt) can be controlled with the range above. The content of the phosphorous acid (salt) can be measured by an analysis by ion chromatography.

If the content of phosphorous acid (salt) based on 100% by mass of the phosphorus compound is controlled within the range above, the chain transfer efficiency of the phosphorus compound tends to improve, reducing the content of the inorganic ion contained in the aqueous poly(meth)acrylic acid (salt) solution. As a result, the dispersibility of inorganic particles particularly improves when the poly(meth)acrylic acid (salt) according to the present invention is used as a dispersant for inorganic particles, for example. The content of phosphorous acid (salt) based on 100% by mass of the phosphorus compound is preferably 0 to 0.25% by mass, and more preferably 0 to 0.2% by mass.

A preferable content of hypophosphorous acid (salt) based on the phosphorus compound containing hypophosphorous acid (salt) is as described later.

The aqueous poly(meth)acrylic acid (salt) solution according to the present invention preferably has a viscosity (25° C.) of 400 to 2000 mPa·s when the concentration of the solid content (non-volatile content) is adjusted to 35 to 60% by mass. At a viscosity set within the range above, the polymer aqueous solution attains good storage stability of a color tone or the like. Additionally, the operationability of slurry production equipment improves when the aqueous poly(meth) acrylic acid (salt) solution according to the present invention is used for a dispersant for inorganic particles, for example. The viscosity of the aqueous poly(meth)acrylic acid (salt) solution can be easily adjusted according to the kind of initiators to be used, the amount of the initiator to be used, the kind of neutralizers, the amount of the neutralizer to be used, a degree of neutralization, and the like. The viscosity is more preferably, 500 to 1500 mPa·s, and still more preferably 600 to 1000 mPa·s.

The viscosity (25° C.) herein is a value obtained by measuring the viscosity 5 minutes after a rotor No. 4 is rotated at 60 rpm (viscosity after the rotor is rotated for 5 minutes) using a B type viscometer, as described later.

The aqueous poly(meth)acrylic acid (salt) solution according to the present invention preferably has a pH of 4.0 to 8.0. More preferably, when the concentration of the solid content (non-volatile content) is adjusted to 35 to 60%, the pH is 4.0 to 8.0. At a pH set within the range of 4.0 to 8.0, the polymer aqueous solution attains good storage stability of a color tone or the like. Additionally, the polymer aqueous solution, when used as a dispersant for inorganic particles, for example, can demonstrate high dispersibility. The pH of the aqueous poly (meth)acrylic acid (salt) solution can be easily adjusted according to the kind of initiators to be used, the amount of the initiator to be used, the kind of neutralizers, the amount of the neutralizer to be used, a degree of neutralization, and the like. The pH is more preferably 4.5 to 7.9, and still more preferably 5.0 to 7.8. If the pH of the aqueous poly(meth)acrylic acid (salt) solution according to the present invention is within the range of 4.5 to 7.9, the polymer aqueous solution, when used as a dispersant for inorganic particles, tends to demonstrate improved dispersibility over time.

The pH can be measured with a pH meter.

Preferably, the aqueous poly(meth)acrylic acid (salt) solution according to the present invention is less colored. For example, as a color tone, the APHA is preferably not more than 300, and more preferably not more than 250. The preparation process according to the present invention described later enables the polymer aqueous solution less colored (attains a good color tone). If the polymer aqueous solution is less colored, the polymer aqueous solution can be preferably used in applications of dispersants and detergent builders, for example.

[Poly(Meth)Acrylic Acid (Salt) Composition]

The aqueous poly(meth)acrylic acid (salt) solution according to the present invention can also be used by drying the aqueous poly(meth)acrylic acid (salt) solution, or replacing or diluting the aqueous poly(meth)acrylic acid (salt) solution with other solvent (referred to as a poly(meth)acrylic acid (salt) composition). The aqueous poly(meth)acrylic acid (salt) solution according to the present invention also includes those obtained by drying and re-dissolving in water the aqueous poly(meth)acrylic acid (salt) solution according to the present invention, and those obtained by drying the poly (meth)acrylic acid (salt) composition according to the present invention and adding any other component thereto.

The any other component is not particularly limited, and examples thereof include polycarboxylic acids (salts) other than poly(meth)acrylic acid (salt).

[Process for Preparing Poly(Meth)Acrylic Acid (Salt) (Aqueous Solution)]

The process for preparing an aqueous poly(meth)acrylic acid (salt) solution according to the present invention comprises the step of polymerizing a monomer in an aqueous solvent in the presence of a phosphorus compound containing hypophosphorous acid (salt).

The poly(meth)acrylic acid (salt) (aqueous solution) is an expression of the poly(meth)acrylic acid (salt) and the aqueous poly(meth)acrylic acid (salt) solution written collectively.

<Polymerization Step>

(Monomer Composition)

The poly(meth)acrylic acid (salt) according to the present invention is preferably prepared by a preparation process comprising the step of polymerizing a (meth)acrylic acid (salt) as an essential component. The poly(meth)acrylic acid (salt) according to the present invention may be prepared by copolymerizing a (meth)acrylic acid (salt) with the other monomer.

The proportion of (meth)acrylic acid (salt) is preferably not less than 90% by mass in terms of acid type based on 100% by mass of all the monomers used in preparation of the poly (meth)acrylic acid (salt) according to the present invention (the total of (meth)acrylic acid (salt) and the other monomer). At a proportion not less than 90% by mass, the polymer aqueous solution to be obtained tends to demonstrate improved performance over time to disperse inorganic particles.

Here, as above, "in terms of acid type" means that the mass proportion of a salt type monomer is calculated considering the salt type monomer as the corresponding acid type monomer. For example, for sodium(meth)acrylate, the mass proportion is calculated considering sodium(meth)acrylate as (meth)acrylic acid. For the other monomer, the mass proportion is also calculated in the same manner in terms of acid type.

In the preparation process according to the present invention, use of acrylic acid (salt) as (meth)acrylic acid (salt) is preferable.

(Polymerization Initiator)

The poly(meth)acrylic acid (salt) according to the present invention can be obtained by polymerizing the monomer containing (meth)acrylic acid (salt) as an essential component (monomer composition) in the presence of an polymerization initiator (also referred to as an initiator). Polymerization initiators known in the art may be used. Specifically, suitable examples thereof include persulfates such as sodium persulfate, potassium persulfate, and ammonium persulfate; hydrogen peroxide; azo compounds such as dimethyl-2,2'-azobis(2-methylpropionate), 2,2'-azobis(2-amidinopropane) hydrochloride, 4,4'-azobis-4-cyanovaleric acid, azobisisobutyronitrile, and 2,2'-azobis(4-methoxy-2,4-dimethylvaleronitrile); and organic peroxides such as benzoyl peroxide, lauroyl peroxide, peracetic acid, di-t-butyl peroxide, and cumene hydroperoxide. Any of these polymerization initiators may be used alone, or a mixture of two or more of these may be used. Only one of these is preferably used because the polymer tends to have a smaller molecular weight distribution.

The amount of polymerization initiator to be used is preferably not more than 15 g, and more preferably 0.1 to 12 g based on 1 mol of all the monomer components unless otherwise specified.

Among the polymerization initiators, persulfates are preferably used because persulfates have a relatively small adverse effect on the dispersibility of inorganic particles when the poly(meth)acrylic acid (salt) to be obtained is used as a dispersant for inorganic particles. For improvement in the ability over time to disperse inorganic particles, the amount of the persulfate to be used is preferably not more than 1.9 g, more preferably not more than 1.6 g, still more preferably not more than 1.2 g, and particularly preferably not more than 1.1 g based on 1 mol of all the monomers. The lower limit of the amount of the persulfate to be used is preferably not less than 0.1 g, and more preferably not less than 0.5 g based on 1 mol of all the monomers.

The method of adding the polymerization initiator is not particularly limited. The substantial amount of the polymerization initiator to be continuously dropped is preferably not less than 50% by mass of a predetermined necessary amount thereof, and more preferably not less than 80% by mass thereof based on the total amount used. Most preferably, all the amount of the polymerization initiator is dropped. Preferably, the polymerization initiator is continuously dropped. The dropping rate may be changed.

The dropping time is not particularly limited. For initiators decomposed relatively fast under the condition of the polymerization temperature and the pH during the polymerization described later, e.g., persulfates such as ammonium persulfate, potassium persulfate, and sodium persulfate, the initiator is preferably dropped until the monomer dropping end time. More preferably, the dropping of the initiator is completed within 30 minutes from the monomer dropping end time. Particularly preferably, the dropping of the initiator is completed within 5 minutes to 20 minutes after the monomer is dropped. This attains an effect of significantly reducing the remaining amount of the monomer in the polymer. The polymerization is not particularly affected if dropping of these initiators is completed before dropping of the monomer is completed. The dropping of these initiators may be set according to the remaining amount of the monomer in the obtained polymer.

The preferable range of only the dropping end time for the initiator decomposed relatively fast has been described. The dropping start time is not limited, and may be properly set. For example, when necessary, the dropping of the initiator may be started before the dropping of the monomer is started. Particularly, in the case of the system in which the initiators are used in combination, the dropping of one initiator may be started, and the dropping of another initiator may be started after a constant period of time has passed or the dropping of one initiator is completed. In any cases, the way of the dropping of the initiator(s) may be set according to the decomposition rate of the initiator and the reactivity of the monomer.

(Chain Transfer Agent)

In the poly(meth)acrylic acid (salt) according to the present invention, a chain transfer agent can be used in addition to the polymerization initiator. The chain transfer agent is not particularly limited as long as the chain transfer agent is a compound that can control the molecular weight. Known chain transfer agents in the art can be used. Specifically, examples of the chain transfer agents include thiol-based chain transfer agents such as mercaptoethanol, thioglycerol, thioglycolic acid, 2-mercaptopropionic acid, 3-mercaptopropionic acid, thiomalic acid, octyl thioglycolate, octyl 3-mercaptopropionate, 2-mercaptoethanesulfonic acid, n-dodecyl mercaptan, octyl mercaptan, and butyl thioglycolate; halides such as carbon tetrachloride, methylene chloride, bromoform, and bromotrichloroethane; secondary alcohols such as isopropanol and glycerin; hypophosphorous acid, salts of hypophosphorous acid, and hydrates thereof; and lower oxides and salts thereof such as sulfurous acid, hydrogen sulfurous acid, dithionous acid, metabisulfurous acid, and salts thereof (e.g. bisulfurous acid salts such as sodium hydrogen sulfite, potassium hydrogen sulfite, sodium dithionate, potassium dithionate, sodium metabisulfite, and potassium metabisulfite). Any of these chain transfer agents may be used alone, or a mixture of two or more of these may be used.

The amount of the chain transfer agent to be added is preferably 1 to 20 g, and more preferably 2 to 15 g based on 1 mol of all the monomer components, unless otherwise specified. At an amount less than 1 g, the molecular weight may not be controlled. Conversely, at an amount more than 20 g, the chain transfer agent may remain, or the purity of the polymer may reduce.

The poly(meth)acrylic acid (salt) (aqueous solution) according to the present invention is polymerized in the presence of a phosphorus compound containing hypophosphorous acid (salt). In the preparation process according to the present invention, the phosphorus compound containing hypophosphorous acid (salt) mainly acts as the chain transfer agent. The phosphorus compound containing hypophosphorous acid (salt) used as the chain transfer agent allows efficient introduction of a phosphorus-containing group into the poly(meth)acrylic acid (salt) to improve the ability over time to disperse inorganic particles.

It is important to control the content of the phosphorous acid (salt) contained in the phosphorus compound containing hypophosphorous acid (salt) because the phosphorus-containing group is efficiently introduced, the amount of the inorganic anion remaining in the aqueous poly(meth)acrylic acid (salt) solution reduces, and the ability over time to disperse inorganic particles significantly improves.

As described above, the phosphorus compound in the present invention represents hypophosphorous acid (salt) or phosphorous acid (salt). Hypophosphorous acid (salt) and phosphorous acid (salt) may exist in a form of a hydrate thereof.

The content of the phosphorous acid (salt) in the phosphorus compound is 0 to 0.3% by mass based on 100% by mass of the phosphorus compound (in terms of sodium salt, hydrated water is excluded from the calculation). The content is preferably not less than 0 and not more than 0.25% by mass, and more preferably not less than 0 and not more than 0.2% by mass.

The content of the hypophosphorous acid (salt) in the phosphorus compound is preferably 99.7 to 100% by mass, more preferably not less than 99.75 and not more than 100% by mass, and particularly preferably not less than 99.8 and not more than 100% by mass based on the 100% by mass of the phosphorus compound (in terms of sodium salt, hydrated water is excluded from the calculation).

For improvement in the ability over time to disperse inorganic particles, the amount of the phosphorus compound to be used is preferably not more than 8.0 g, more preferably not more than 7.0 g, and still more preferably not more than 6.0 g based on 1 mol of all the monomers. The lower limit of the amount of the phosphorus compound to be used is preferably not less than 1.0 g, and more preferably not less than 1.5 g based on 1 mol of all the monomers. If the amount of the phosphorus compound to be used is more than 8.0 g based on 1 mol of all the monomers, the phosphorus compound that does not contribute to chain transfer (phosphorus compound not taken into the polymer terminal) increases to increase the amount of the inorganic anion. As a result, the dispersion ability over time may reduce, or the hue of the poly(meth)acrylic acid (salt) may be worse.

From the viewpoint of setting the content of the phosphorous acid (salt) contained in the phosphorus compound to the range above, the phosphorus compound as the raw material containing as small a content of the phosphorous acid (salt) as possible is preferably used.

For example, in the case where the phosphorus compound is used in a form of an aqueous solution, the aqueous solution is used preferably within 72 hours, more preferably within 48 hours, and still more preferably within 24 hours from the viewpoint of suppressing production of phosphorous acid after preparation of the aqueous solution.

The aqueous solution of the phosphorus compound is preferably prepared at a temperature of not more than 40° C. within 180 minutes, for example. The preparation time is more preferably within 150 minutes, still more preferably within 120 minutes, and particularly preferably within 100 minutes.

(Decomposition Catalyst, Reducing Compound)

The poly(meth)acrylic acid (salt) according to the present invention may be prepared using a catalyst for decomposing polymerization initiators and a reducing compounds (these are also referred to as a reaction accelerator) (added to the polymerization system) in addition to the polymerization initiator and the like.

Examples of compound acting as the catalyst for decomposing polymerization initiators or the reducing compound include heavy metal ions or heavy metal salts. Namely, the poly(meth)acrylic acid (salt) according to the present invention may be prepared using a heavy metal ion or a heavy metal salt (added to the polymerization system) in addition to the polymerization initiator and the like.

In the present invention, the term "heavy metal ions" is intended to include metals having a specific gravity of not less than 4 g/cm$^3$.

Preferable examples of the heavy metal ion include iron, cobalt, manganese, chromium, molybdenum, tungsten, copper, silver, gold, lead, platinum, iridium, osmium, palladium, rhodium, and ruthenium. Any of these heavy metals may be used alone, or two or more of these may be used in combination. Among these, iron is more preferable.

The ionic valency of the heavy metal ions is not particularly limited. For example, when iron is used as a heavy metal, the initiator may include iron ion in the $Fe^{2+}$ form or $Fe^{3+}$ form, or may contain iron in both forms.

In the present invention, an aqueous solution or water-based solution prepared by dissolving a heavy metal salt (heavy metal compound) is added to the polymerization system. Thereby, the heavy metal ions exist in the reaction system. The heavy metal salt used in the preparation is any heavy metal salts as long as they contain a desired heavy metal ion to be contained in the initiator, and can be selected according to the initiator to be used. For example, when the iron is selected as the heavy metal ion, preferable examples of the heavy metal salts to be used include Mohr's salt ($Fe(NH_4)_2(SO_4)_2 \cdot 6H_2O$), ferrous sulfate heptahydrate, ferrous chloride, and ferric chloride. When the manganese is selected as the heavy metal ion, manganese chloride can be suitably used, for example. In use of these heavy metal salts, all of these are water-soluble compounds. These can be used in the form of an aqueous solution, and are easy to handle. The solvent for the solution prepared by dissolving the heavy metal salt is not limited to water. Any solvent can be used in the range without impairing the solubility of the heavy metal salt unless the solvent significantly inhibits the polymerization reaction in production of the poly(meth)acrylic acid (salt) (aqueous solution) according to the present invention.

The heavy metal ion is added to the polymerization system as the aqueous solution or water-based solution of the heavy metal salt. In the preparation process according to the present invention, the heavy metal salt is preferably fed to the polymerization system as an aqueous solution containing a heavy metal salt and a carboxyl group-containing compound. By feeding the heavy metal salt into the polymerization system as the aqueous solution containing a heavy metal salt and a carboxyl group-containing compound, the heavy metal ion can demonstrate its effect stably, reducing fluctuation in the molecular weight of the polymer to be obtained and stably producing a polymer having a desired molecular weight.

The term "polymerization system" means the inside of a reaction container in which the polymerization reaction is to be performed or being performed, and usually means the inside of a polymerization solvent charged at the start of the reaction or the inside of the polymerization solution during the polymerization.

When the heavy metal salt and the carboxyl group-containing compound are contained, the ratio of the carboxyl group-containing compound to the heavy metal salt is preferably 1 to 100 parts by mass, and more preferably 10 to 80 parts by mass based on 100 parts by mass of the heavy metal salt.

The pH of the aqueous heavy metal salt solution, when added to the polymerization system, is preferably not more than 8, more preferably not more than 7, and particularly preferably not more than 6. The pH can be measured with a pH meter.

The carboxyl group-containing compound is not particularly limited as long as the compound is an organic compound having a carboxyl group. Examples of the carboxyl group-containing compound include (meth)acrylic acid, maleic acid, fumaric acid, itaconic acid, crotonic acid, 2-methylene glutaric acid, and anhydrides thereof; and acetic acid, propionic acid, butyric acid, formic acid, oxalic acid, succinic acid, glycolic acid, and glyoxylic acid. From the viewpoint of reducing impurities, compounds having a polymerizable unsaturated double bond are preferable. For example, (meth)acrylic acid, maleic acid, fumaric acid, itaconic acid, crotonic acid, 2-methylene glutaric acid, and anhydrides thereof are preferable.

The content of the heavy metal ion is preferably 0.1 to 10 ppm based on the total mass of the polymerization reaction solution at the completion of the polymerization reaction. At a content of the heavy metal ion less than 0.1 ppm, a sufficient effect of the heavy metal ion may not be demonstrated. Meanwhile, at a content of the heavy metal ion more than 10 ppm, the polymer to be obtained may have a bad color tone. A large content of the heavy metal ion may cause dirt in a detergent builder when the polymer as a product is used as the detergent builder, for example.

The term "at the completion of the polymerization reaction" means the time when the polymerization reaction in the polymerization reaction solution substantially completes and a desired polymer is obtained. For example, when the polymer polymerized in the polymerization reaction solution is subsequently neutralized with an alkali component, the content of the heavy metal ion is calculated based on the total mass of the polymerization reaction solution after the neutralization. In the case where two or more heavy metal ions are contained, the total amount of the heavy metal ions may be within the range above.

In the aqueous solution or water-based solution prepared by dissolving the heavy metal compound and added to the polymerization system, the concentration of the heavy metal compound is preferably 0.01% by mass to 10% by mass, and more preferably 0.01% by mass to 0.1% by mass.

Besides the heavy metal ions (heavy metal salts), other examples of the catalyst for decomposing polymerization initiators include halogenated metals such as lithium chloride and lithium bromide; metal oxides such as titanium oxide and silicon dioxide; metal salts of inorganic acids such as hydrochloric acid, hydrobromic acid, perchloric acid, sulfuric acid, and nitric acid; carboxylic acids such as formic acid, acetic acid, propionic acid, butyric acid, isobutyric acid, benzoic acid, and esters and metal salts thereof; and heterocyclic amines such as pyridine, indole, imidazole, and carbazole, and derivatives thereof. Any of these decomposition catalysts may be used alone, or two or more of these may be used in combination.

Besides the heavy metal ions (heavy metal salts), other examples of the reducing compound include inorganic compounds such as boron trifluoride ether adducts and perchloric acid; sulfur-containing compounds such as sulfur dioxide, sulfites, sulfates, bisulfites, thiosulfates, sulfoxylates, benzene sulfinic acid and substituted compounds thereof, and homologues of cyclic sulfinic acid such as p-toluene sulfinic acid; mercapto compounds such as octyl mercaptan, dodecyl mercaptan, mercapto ethanol, α-mercaptopropionic acid, thioglycolic acid, thiopropionic acid, sodium α-thiopropionate sulfopropylester, and sodium α-thiopropionate sulfoethylester; nitrogen-containing compounds such as hydrazine, β-hydroxyethylhydrazine, and hydroxylamine; aldehydes such as formaldehyde, acetaldehyde, propionaldehyde, n-butylaldehyde, isobutylaldehyde, and isovalerianaldehyde; and ascorbic acid. Any of these reducing compounds may also be used alone, or two or more of these may be used in combination. The reducing compound such as mercapto compounds may be added as the chain transfer agent.

In the process for preparing the poly(meth)acrylic acid (salt) (aqueous solution) according to the present invention, when necessary a pH adjuster, a buffer, and the like can be used in addition to the polymerization initiator, the chain transfer agent, and the reaction accelerator.

(Polymerization Solution)

The poly(meth)acrylic acid (salt) according to the present invention is preferably prepared by solution polymerization. In the preparation, an aqueous solvent is used as the solvent. The solvent is preferably a mixed solvent containing not less than 50% by mass of water based on the entire solvent or water. Use of only water is suitable because the step of removing the solvent is eliminated. In the case where the chain transfer agent is used, a solvent difficult to chain transfer is preferable in order to enhance chain transfer efficiency (to take a larger amount of the chain transfer agent into the polymer terminal) and to reduce inorganic anions which are impurities. From the viewpoint above, preferably, only water is used as the solvent, or water is used in combination with an organic solvent whose amount to be used is minimized.

From the viewpoint above, for example, when an organic solvent is used, the amount of the organic solvent is preferably not more than 10% by mass, more preferably not more than 5% by mass, and still more preferably not more than 1% by mass based on 100% by mass of the reaction solution after the polymerization is completed.

Suitable examples of the solvent usable in combination with water in the polymerization include alcohols such as methyl alcohol, ethyl alcohol, and isopropyl alcohol; glycerin; polyethylene glycol; amides such as dimethyl formaldehyde; and ethers such as diethyl ether and dioxane. Any of these solvents may be used alone, or two or more of these may be used in combination.

In the polymerization reaction, the concentration of the solid content after the polymerization is completed (the concentration of a non-volatile content in the polymerization solution, which is measured by the measurement method described later) is preferably 10 to 60% by mass, more preferably 15 to 50% by mass, and still more preferably 20 to 45% by mass based on 100% by mass of the polymerization solution.

(Other Preparation Condition)

The poly(meth)acrylic acid (salt) according to the present invention can be prepared using any of a batch polymerization method, a continuous polymerization method, and a semi-continuous polymerization method. As the condition for preparing the poly(meth)acrylic acid (salt) according to the present invention, the methods above and modified known polymerization method or known methods can be used, unless otherwise specified.

The temperature in the polymerization is preferably not less than 70° C., more preferably 75 to 110° C., and still more preferably 80 to 105° C. At a temperature in the polymerization within the range (not less than 70° C.), the amount of the remaining monomer component tends to reduce, and the dispersibility of the polymer tends to improve. The temperature in the polymerization is not necessarily kept constant all the time while the polymerization reaction progresses. For example, the polymerization may be started from room temperature; the temperature may be raised to the setting temperature for a proper temperature raising time or at a proper temperature raising rate; then, the setting temperature may be kept. Alternatively, the polymerization temperature may be changed (raised or reduced) according to the monomer component or the method of dropping the initiator or the like with a lapse of time while the polymerization reaction progresses.

The pressure in the reaction system may be any of normal pressure (atmospheric pressure), reduced pressure, and increased pressure. From the viewpoint of the molecular weight of the polymer to be obtained, preferably, the polymerization is performed under normal pressure, or the reaction system is sealed and the polymerization is performed under increased pressure. The polymerization is preferably performed under normal pressure (atmospheric pressure) from the viewpoint of equipment such as pressuring and depressurizing apparatuses, a pressure-resistant reaction container, and pipes.

The atmosphere in the reaction system may be air atmosphere. Preferably, the atmosphere in the reaction system is an inert atmosphere. For example, the air in the system is preferably replaced with an inert gas such as nitrogen before the polymerization is started.

<Neutralization Step>

The poly(meth)acrylic acid (salt) (aqueous solution) according to the present invention is preferably prepared by the step (step N) of neutralizing an aqueous solution containing an acid type and/or partially neutralized poly(meth) acrylic acid (salt) with a basic substance. The preparation method attains a particularly good color tone of the polymer aqueous solution to be obtained. Additionally, the polymer aqueous solution tends to demonstrate particularly high dispersibility when the polymer aqueous solution is used as the dispersant for inorganic particles, for example.

Examples of the basic substance include hydroxides of alkali metals such as sodium hydroxide and potassium hydroxide; carbonates of alkali metals such as sodium carbonate, potassium carbonate, and sodium hydrogencarbonate; alkaline earth metal compounds such as calcium hydroxide, magnesium hydroxide, and calcium oxide; organic amines such as monoethanolamine and diethanolamine; and ammonia.

[Dispersant]

The dispersant according to the present invention comprises the aqueous poly(meth)acrylic acid (salt) solution according to the present invention.

The aqueous poly(meth)acrylic acid (salt) solution according to the present invention can be suitably used as dispersants for inorganic particles, and particularly preferably as dispersants for calcium carbonate, clay, and the like.

[Inorganic Particle Dispersion]

The inorganic particle dispersion according to the present invention contains not less than 70% by mass of an inorganic particle, and prepared by the step of adding the aqueous poly(meth)acrylic acid (salt) solution according to the present invention and grinding the inorganic particle.

The inorganic particle dispersion according to the present invention contains the poly(meth)acrylic acid (salt) according to the present invention as an essential component.

Preferably, the inorganic particle dispersion according to the present invention contains 0.05 to 10% by mass of a poly(meth)acrylic acid (salt) based on 100% by mass of the inorganic particle dispersion (% by mass calculated wherein 100 mol % of the carboxyl group is a sodium salt (in terms of sodium salt)). The content of a poly(meth)acrylic acid (salt) is more preferably 0.1 to 3.0% by mass, still more preferably 0.15 to 2.0% by mass, and particularly preferably 0.2 to 1.0% by mass. At a content within the range of 0.05 to 10% by mass, the viscosity of the inorganic particle dispersion according to the present invention can be reduced.

The inorganic particle dispersion according to the present invention is preferably prepared, as described later, by adding the aqueous poly(meth)acrylic acid (salt) solution according to the present invention and grinding the inorganic particle (namely, the preparation process comprises the step of adding the aqueous poly(meth)acrylic acid (salt) solution according to the present invention and grinding the inorganic particle). This attains the viscosity of the inorganic particle dispersion stabilized over time and a good color tone.

The inorganic particles used in the present invention are not particularly limited. Examples of the inorganic particles include kaolin, clay, calcium carbonates (such as heavy calcium carbonate and light calcium carbonate), titanium dioxide, satin white, talc, aluminum hydroxide, magnesium hydroxide, and plastic pigments. Preferably, the inorganic particles are kaolin, clay, and calcium carbonates.

The inorganic particle dispersion according to the present invention contains not less than 70% by mass of the inorganic particle based on 100% by mass of the inorganic particle dispersion. The content of the inorganic particle is preferably not less than 73% by mass, more preferably not less than 75% by mass, and still more preferably not less than 78% by mass. If the inorganic particle dispersion contains less than 70% by mass of the inorganic particle, the productivity of paper reduces when the inorganic particle dispersion is used as a pigment (inorganic particle) dispersion to be applied to paper, for example. The upper limit of the content of the inorganic particle is preferably not more than 85% by mass, and more preferably not more than 80% by mass.

Usually, the inorganic particle dispersion according to the present invention contains water. In this case, the content of water is preferably not more than 25% by mass, more preferably not more than 22% by mass, still more preferably not more than 20% by mass, and particularly preferably not more than 17% by mass based on 100% by mass of the inorganic particle dispersion. The lower limit of the content of water in the inorganic particle dispersion is preferably not less than 15% by mass, and more preferably not less than 20% by mass.

The average particle size of the inorganic particle contained in the inorganic particle dispersion according to the present invention is preferably not more than 2.0 μm, and more preferably not more than 1.5 μm. The lower limit of the average particle size is preferably not less than 0.01 μm, and more preferably not less than 0.05 μm. At a particle size within the range above, the paper tends to have a good gloss and white chromaticity when the inorganic particle dispersion is used as a pigment dispersant to be applied to paper, for example.

The average particle size here is a particle size measured by a laser particle size distribution analyzer as used in Examples described later.

The inorganic particle dispersion contains preferably not less than 90%, and more preferably not less than 91% of the inorganic particle having a particle size of not more than 2 μm based on 100% by mass of all the inorganic particles. At a particle size within the range above, the paper tends to have a good gloss and white chromaticity when the inorganic particle dispersion is used as a pigment dispersant to be applied to paper, for example.

The inorganic particle dispersion according to the present invention can contain condensation phosphoric acid and salts thereof, phosphonic acid and salts thereof, polyvinyl alcohol, or the like when necessary as an organic solvent or other compounding agent.

In the inorganic particle dispersion according to the present invention, the concentration (content) of the inorganic anion including a sulfur atom or a phosphorus atom is preferably 0 to 400 ppm based on the inorganic particle dispersion. If the concentration of the inorganic anion including a sulfur atom or a phosphorus atom is more than 400 ppm, the stability over time of the viscosity of the inorganic particle dispersion tends to reduce.

Examples of inorganic anions containing a sulfur atom or a phosphorus atom include sulfuric acid ion, sulfurous acid ion, phosphoric acid ion, phosphorous acid ion, and hypophosphorous acid ion as described above.

The inorganic particle dispersion according to the present invention preferably has a viscosity (25° C.) of 50 to 1000 mPa·s when the concentration of the solid content (non-volatile content) is adjusted to 70 to 80% by mass. At a viscosity set within the range above, the operationability of the dispersion or the like is kept. The viscosity of the inorganic particle dispersion can be easily controlled according to the kind of inorganic particles to be used, the amount thereof, and the like. More preferably, the viscosity is 100 to 800 mPa·s.

As described later, the viscosity (25° C.) is a value obtained by measuring the viscosity 5 minutes after a rotor No. 4 is rotated at 60 rpm (viscosity after the rotor is rotated for 5 minutes) using a B type viscometer.

[Process for Preparing Inorganic Particle Dispersion]

The process for preparing the inorganic particle dispersion according to the present invention can be performed by properly referring a known process in the art or using known processes in combination. Typically, examples thereof include a process in which primary dispersion is performed, and the obtained dispersion is subjected to a wet grinding treatment. This process is suitable because an inorganic particle dispersion to be obtained has a low viscosity, high dispersion stability, and a high concentration. The process for preparing the inorganic particle dispersion according to the present invention is not limited to the wet grinding treatment. A preparation process without performing the wet grinding treatment is used without limitation.

In the process for preparing the inorganic particle dispersion, the method for primary dispersion is not particularly limited. Mixing with a mixer is preferable, and an apparatus having a high shear force such as a high speed disper, a homomixer, a ball mill, a Cowles mixer, and a stirring disper is suitably used.

The process for preparing the inorganic particle dispersion according to the present invention comprises the step of mixing the aqueous poly(meth)acrylic acid (salt) solution according to the present invention with the inorganic particle. In the mixing step, usually, water is further used.

The process for preparing the inorganic particle dispersion according to the present invention preferably comprises the step of adding the aqueous poly(meth)acrylic acid (salt) solution according to the present invention and wet grinding the inorganic particle. Thereby, the particle size of the inorganic particle contained in the inorganic particle dispersion can be set within a desired range efficiently. In this case, the poly(meth)acrylic acid (salt) (aqueous solution) according to the present invention also serves as a grinding aid.

The process for preparing the inorganic particle dispersion according to the present invention can provide a pigment slurry for paper making having a low viscosity, the stability over time of the viscosity, and a high concentration, for example. Furthermore, the process can provide a coating paper for printing in which coating defects are suppressed when the slurry is applied, good stencil paper coating properties, print gloss, blister resistance, and a feeling of an even print surface are given, and merits intrinsic to the pigment such as white chromaticity, opacity, and ink accepting properties are provided.

[Application of Poly(Meth)Acrylic Acid (Salt) (Aqueous Solution)]

As above, the poly(meth)acrylic acid (salt) (aqueous solution) according to the present invention can be preferably used as dispersants for inorganic particles, grinding aids for inorganic particles, and the like. By use of poly(meth)acrylic acid (salt) (aqueous solution) according to the present invention as the dispersant for inorganic particles or a grinding aid for inorganic particles, an inorganic particle dispersion having a high concentration, a low viscosity, stable viscosity over time, and a good color tone can be prepared.

The poly(meth)acrylic acid (salt) (aqueous solution) according to the present invention can be used as water treatment agents, fiber treating agents, dispersants, and detergent builders (or detergent compositions), for example. The detergent builder can be added to various detergents for cloths, tableware, cleaning, hair, bodies, toothbrushing, and vehicles, and used.

<Water Treatment Agent>

The poly(meth)acrylic acid (salt) (aqueous solution) according to the present invention can be used for a water treatment agent. The water treatment agent may be used with other compounding agents such as polymerized phosphoric acid salts, phosphonic acid salts, anti-corrosion agents, slime control agents, and chelating agents when necessary.

The water treatment agent is useful for scale inhibition of cooling water circulation systems, boiler water circulation systems, seawater desalination plants, pulp digesters, black liquor condensing kettles and the like. In addition, any suitable water-soluble polymer may be included within a range of not affecting the performance or effect of the water treatment agent.

The water-soluble polymer is not particularly limited. Examples of the water-soluble polymer include polymers having a sulfonic acid group other than the poly(meth)acrylic acid (salt) according to the present invention.

<Fiber Treating Agent>

The poly(meth)acrylic acid (salt) (aqueous solution) according to the present invention can be used for a fiber treating agent. The fiber treating agent contains at least one selected from the group consisting of dyeing agents, peroxides, and surfactants, and the polymer according to the present invention.

In the fiber treating agent, the content of the polymer according to the present invention is preferably 1 to 100% by mass, and more preferably 5 to 100% by mass based on 100% by mass of the total amount of the fiber treating agent. In addition, any suitable water-soluble polymer may be included within a range of not affecting the performance or effect of the fiber treating agent.

An example of the composition of the fiber treating agent closer to the embodiment will be described below. The fiber treating agent can be used in steps of scouring, dyeing, bleaching, and soaping in fiber treatment. Examples of dyeing agents, peroxides, and surfactants include those usually used in the fiber treating agent.

The blending ratio of the at least one selected from the group consisting of dyeing agents, peroxides, and surfactants to the poly(meth)acrylic acid (salt) (aqueous solution) according to the present invention is determined in terms of fiber treating agent purity. For example, to improve white chromaticity, color irregularity, and dyeing fastness of fibers, the fiber treating agent is preferably used in the form of a composition comprising 0.1 to 100 parts by mass of the at least one selected from the group consisting of dyeing agents, peroxides, and surfactants based on 1 part by mass of the polymer according to the present invention.

The fiber treating agent can be used for any suitable fibers. Examples of the fibers include cellulosic fibers such as cotton and hemp; chemical fibers such as nylon and polyester; animal fibers such as wool and silk thread; semi-synthetic fibers such as rayon; and textiles and mixed products thereof.

For the fiber treating agent used in a scouring step, an alkali agent and a surfactant are preferably blended with the poly(meth)acrylic acid (salt) (aqueous solution) according to the present invention. For the fiber treating agent used in a bleaching step, a peroxide and a silicic acid-containing agent such as sodium silicate as a decomposition inhibitor for an alkaline bleaches are preferably blended with the poly(meth)acrylic acid (salt) (aqueous solution) according to the present invention.

<Detergent Composition>

The poly(meth)acrylic acid (salt) (aqueous solution) according to the present invention can also be added to detergent compositions. In the detergent compositions, the content of the polymer according to the present invention is not particularly limited. From the viewpoint of demonstrating high builder performance, the content of the polymer according to the present invention is preferably 0.1 to 15% by mass, more preferably 0.3 to 10% by mass, and still more preferably 0.5 to 5% by mass based on the total amount of the detergent composition.

The detergent composition used for detergents usually contains surfactants and additives used in detergents. The specific forms of these surfactants and additives are not particularly limited, and are appropriately selected based on common knowledge in the field of detergents. The detergent composition may be in the form of a powder or liquid.

One or more surfactants selected from the group consisting of anionic surfactants, nonionic surfactants, cationic surfactants, and amphoteric surfactants are used. When two or more of them are used in combination, the total amount of anionic surfactant(s) and nonionic surfactant(s) is preferably not less than 50% by mass, more preferably not less than 60% by mass, further more preferably not less than 70% by mass, and particularly preferably not less than 80% by mass based on all the surfactants.

Suitable examples of anionic surfactants include alkylbenzene sulfonates, alkylether sulfates, alkenylether sulfates, alkyl sulfates, alkenyl sulfates, $\alpha$-olefinsulfonates, $\alpha$-sulfo fatty acid or $\alpha$-sulfo fatty acid ester salts, alkane sulfonates, saturated fatty acid salts, unsaturated fatty acid salts, alkylether carboxylates, alkenylether carboxylates, amino acid-type surfactants, N-acylamino acid-type surfactants, alkyl phosphates or salts thereof, and alkenyl phosphates or salts thereof. The alkyl groups or alkenyl groups in these anionic surfactants may have alkyl side groups such as a methyl side group.

Suitable examples of nonionic surfactants include polyoxyalkylene alkyl ether, polyoxyalkylene alkenyl ether, polyoxyethylene alkyl phenyl ether, higher-fatty-acid alkanol amide or alkylene oxide adducts thereof, sucrose fatty acid esters, alkyl glycoxydes, fatty acid glycerol monoester, and alkylamine oxides. The alkyl groups or alkenyl groups in these nonionic surfactants may have alkyl side groups such as a methyl side group.

Suitable examples of cationic surfactants include quaternary ammonium salts. Suitable examples of amphoteric surfactants include carboxyl-type amphoteric surfactants and sulfobetaine-type amphoteric surfactant. The alkyl groups or the alkenyl groups in these cationic surfactants and amphoteric surfactants may have alkyl side groups such as a methyl side group.

The blending proportion of the surfactant is usually 10 to 60% by mass, preferably 15 to 50% by mass, more preferably 20 to 45% by mass, and particularly preferably 25 to 40% by mass based on the total amount of the detergent composition. An excessively small blending proportion of the surfactant may prevent demonstration of sufficient washing performance. An excessively large blending proportion of the surfactant may lead to disadvantages in terms of cost.

Suitable examples of additives include alkali builders, chelate builders, anti-redeposition agents for preventing redeposition of contaminants such as sodium carboxymethylcellulose, stain inhibitors such as benzotriazole and ethylenethiourea, soil release agents, color migration inhibitors, softening agents, alkaline substances for pH adjustment, perfumes, solubilizing agents, fluorescent agents, coloring agents, foaming agents, foam stabilizers, lustering agents, bactericides, bleaching agents, bleaching assistants, enzymes, dyes, and solvents. Powder detergent compositions preferably contain zeolite.

The detergent composition may contain other detergent builder in addition to the polymer according to the present invention. The other detergent builder is not particularly limited. Examples of the other detergent builder include alkali builders such as carbonates, hydrogencarbonates, and silicates; chelate builders such as tripolyphosphates, pyrophosphates, Glauber's salt, nitrilotriacetates, ethylene diamine tetraacetate, citrates, fumarates, and zeolite; and carboxyl derivatives of polysaccharides such as carboxymethyl cellulose. Examples of counter salts used with the builder include alkali metals such as sodium and potassium, ammonium, and amine.

The blending proportion of the additives and the other detergent builder in total is usually preferably 0.1 to 50% by mass based on 100% by mass of the cleansing composition. The blending proportion is more preferably 0.2 to 40% by mass, still more preferably 0.3 to 35% by mass, particularly preferably 0.4 to 30% by mass, and most preferably 0.5 to not more than 20% by mass. A blending proportion of the additives and the other detergent builder less than 0.1% by mass may prevent demonstration of sufficient detergent performance. A blending proportion more than 50% by mass may lead to disadvantages in terms of cost.

It is understood that the concept of the "detergent composition" includes detergents used only for specific usages such as synthetic detergents of household detergents, detergents for industrial use such as detergents used in the textile industry, hard surface detergents, and bleaching detergents in which the performance delivered by one component is enhanced.

When the detergent composition is in the form of a liquid, the amount of water contained in the liquid detergent composition is usually preferably 0.1 to 75% by mass, more preferably 0.2 to 70% by mass, still more preferably 0.5 to 65% by mass, further still more preferably 0.7 to 60% by mass, particularly preferably 1 to 55% by mass, and most preferably 1.5 to 50% by mass based on the total amount of the liquid detergent composition.

When the detergent composition is in the form of a liquid, the kaolin turbidity of the detergent composition is preferably not more than 200 mg/L, more preferably not more than 150 mg/L, still more preferably not more than 120 mg/L, particularly preferably not more than 100 mg/L, and most preferably not more than 50 mg/L.

Comparing the case where the poly(meth)acrylic acid (salt) (aqueous solution) according to the present invention is added to the liquid detergent composition as the detergent builder with the case where the poly(meth)acrylic acid (salt) (aqueous solution) according to the present invention is not added to the liquid detergent composition as the detergent builder, change (the difference) in the kaolin turbidity is preferably not more than 500 mg/L, more preferably not more than 400 mg/L, still more preferably not more than 300 mg/L, particularly preferably not more than 200 mg/L, and most preferably not more than 100 mg/L. The value of the kaolin turbidity is a value measured by the following method.

(Method of Measuring Kaolin Turbidity)

A uniformly stirred sample (liquid detergent) is charged in 50 mm square cells having a thickness of 10 mm, and bubbles are removed therefrom. Then, the sample is measured for tubidity (kaolin turbidity: mg/L) at 25° C. using an NDH2000 (trade name, turbidity meter) made by Nippon Denshoku Industries Co., Ltd.

Suitable examples of enzymes that can be blended with the cleansing composition include proteases, lipases, and cellulases. Among these, proteases, alkali lipases, and alkali cellulases are preferable because these are highly active in alkali washing liquids.

The amount of the enzyme to be added is preferably not more than 5% by mass based on 100% by mass of the cleansing composition. At an amount more than 5% by mass, the washing performance no longer improves, and disadvantages in cost may be caused.

The detergent composition produces little precipitates of salts and has a high washing effect even when used in hard water regions in which water contains high concentrations of calcium ions and magnesium ions (for example, not less than 100 mg/L). The effect is particularly remarkable when the detergent composition contains an anion surfactant such as LAS.

[Applications of Inorganic Particle Dispersion]

The inorganic particle dispersion according to the present invention can be used for paper coating, paper processing, ceramics molding, fiber treatment, and emulsion coating materials, for example.

EXAMPLES

Hereinafter, the present invention will be described more in detail using Examples, but the present invention will not be limited to only these Examples. Unless otherwise specified, "parts" means "parts by mass," and "%" means "% by mass."

The weight average molecular weight and number average molecular weight of the polymer according to the present invention, the amount of the non-reacted monomer, the polymer composition, and the solid content in the polymer aqueous solution were measured according to the following methods.

<Method of Measuring Solid Content in the Polymer Aqueous Solution>

The polymer aqueous solution was left as it was for 2 hours under a nitrogen atmosphere in an oven heated to 110° C., and dried. From change in the mass before and after drying, the solid content (%) and a volatile component (%) were calculated.

<Measurement of Effective Component>

An effective component value was measured using an automatic titrator COM-1500 (made by Hiranuma Sangyo Co., Ltd.) and calculated as the concentration of a carboxyl group in the polymer obtained by polymerization. First, carboxylic acid in the polymer was neutralized completely with a 1 N aqueous NaOH solution. Then, a titration curve was created using a 1 N aqueous HCl solution. From the difference between the second inflection point and the first inflection point in the curve (amount of the 1 N HCl solution), the effective component value was calculated as follows:

effective component value (%)=9.4×(1 N HCl amount (mass) at second inflection point−1 N HCl amount (mass) at first inflection point)×HCl titer/ amount of analyzed product (mass).

The amount of the analyzed product represents the mass of the analyzed aqueous poly(meth)acrylic acid (salt) solution.

<Measurement Condition for Weight Average Molecular Weight and Number Average Molecular Weight (GPC)>

Apparatus: L-7000 Series made by Hitachi, Ltd.
Detector: HITACHI RI Detector L-2490
Column: TSK-GEL G3000 PWXL made by Tosoh Corporation
Column temperature: 40° C.
Flow rate: 0.5 mL/min
Calibration curve: POLY SODIUM ACRYLATE STANDARD made by Sowa Kagaku K.K.

Eluent: solution obtained by diluting a mixture of sodium dihydrogen phosphate dodecahydrate/disodium hydrogen phosphate dihydrate (34.5 g/46.2 g) with pure water to make 5000 g.

<Measurement of Monomer and the Like in Polymer Aqueous Solution>

The monomer was measured on the following condition using liquid chromatography.

Measurement apparatus: L-7000 Series made by Hitachi, Ltd.
Detector: UV detector L-7400 made by Hitachi, Ltd.
Column: SHODEX RSpak DE-413 made by Showa Denko K.K.
Temperature: 40.0° C.
Eluent: 0.1% aqueous phosphoric acid solution
Flow rate: 1.0 ml/min.

<Analysis of Anion Concentration (by Analysis by Ion Chromatography)>

The anion concentration was analyzed by ion chromatography on the following condition.

Apparatus: 762 Interface made by Metrohm AG
Detector: 732 IC Detecter made by Metrohm AG
Method of ion analysis: suppressor method
Column: Shodex IC SI-90 4E
Guard column: Shodex SI-90 G
Column temperature: 40° C.
Eluent: $NaHCO_3$ water (2 g of $NaHCO_3$ was diluted with water to make 2000 g)
Flow rate: 1.0 mL/min.

The polymer aqueous solutions obtained in Examples below were analyzed. The sulfuric acid ion derived from sodium persulfate and the hypophosphorous acid ion derived from sodium hypophosphite were detected.

<Analysis of Phosphorus-Containing Group Contained in Polymer>

As above, the phosphorus atom introduced into the polymer was measured by $^{31}$P-NMR analysis. In the polymers obtained in Examples below, peaks all derived from the phosphinate group were observed.

<Particle Size>

The particle size of the inorganic particle was analyzed using a laser type particle size distribution measurement apparatus LA-950 (made by Hitachi, Ltd.).

<Viscosity>

The viscosity of the inorganic particle dispersion was obtained by measuring the viscosity 5 minutes after a rotor No. 4 was rotated at 60 rpm (viscosity immediately after grinding) using a B type viscometer. The recovered inorganic particle dispersion was stored under an environment at 25° C. immediately before the measurement.

The sample was stored for one week at 25° C. Then, using a B type viscometer, the viscosity 5 minutes after a rotor No. 4 was rotated at 60 rpm was measured (viscosity after one week).

Example 1

Using a reaction apparatus including a batch type polymerization tank (made of SUS), a thermometer included in the polymerization tank, a stirrer (paddle blade), external circulation passages for distilled products, a jacket, feeding passages (for the polymerization composition and for the neutralizer), and a reflux cooling apparatus, polymerization was performed according to the polymerization formula and condition shown below. First, 146.8 parts by mass of ion exchange water was charged. Subsequently, while the aqueous solution in the polymerization tank was stirred, the temperature of the aqueous solution was raised using an external jacket under normal temperature to reflux the aqueous solution.

Next, 383.1 parts by mass of an 80% by mass aqueous acrylic acid solution (hereinafter, also referred to as the "80% AA") was dropped over 180 minutes. 20.2 parts by mass of a 15% by mass aqueous sodium persulfate solution (hereinafter, also referred to as the "15% NaPS") was dropped over 185 minutes. 36.1 parts by mass of a 37.4% by mass aqueous sodium hypophosphite solution (hereinafter, also referred to as the "37.4% SHP") was dropped over 180 minutes. These solutions were dropped individually from the leading nozzles of separate feeding passages. Each of the components was dropped continuously at a constant dropping rate. The content of the phosphorous acid (salt) to the total amount of the hypophosphorous acid (salt) and phosphorous acid (salt) contained in the aqueous sodium hypophosphite solution (content of the phosphorous acid (salt) based on 100% by mass of the phosphorus compound) was 2800 ppm (=0.28% by mass) (in terms of sodium salt).

Subsequently, heating was continued for 30 minutes on the refluxing condition, and stopped. 69.3 parts by mass of water was added. Then, 345 parts by mass of a 48% by mass aqueous sodium hydroxide solution (AA neutralization rate of 97.1 mol %) was dropped into the polymerization tank from the leading nozzle of the feeding passage to neutralize the polymer. Thus, an aqueous solution (1) containing polyacrylic acid (salt) was obtained.

In the obtained aqueous solution (referred to as a polymer aqueous solution (1)), the solid content value was 43.2%, the effective component value was 40.6%, and the pH was 6.9. The polyacrylic acid (salt) had a weight average molecular weight (Mw) of 5900, and the weight average molecular weight (Mw)/number average molecular weight (Mn) of 2.19. In the polymer aqueous solution (1), the total concentration of the inorganic anion (mainly the sulfuric acid ion and the hypophosphorous acid ion were detected) was 3200 ppm (of which the concentration of the inorganic anion including a phosphorus atom was 2000 ppm).

Next, 200 parts by mass of a commercially available heavy calcium carbonate powder (made by Maruo Calcium Co., Ltd.) (76.9% based on the total charged amount of the inorganic particle dispersion) was added into a 500 ml SUS container. An SUS stirring blade having a 3-stage pin attached thereto was attached to the largest opening provided on the top of a glass lid for a four-necked separable flask wound a heat insulating material. The largest opening had a stirring seal attached thereto. The remaining three openings were covered with silicone rubber caps. An SUS container was fixed to the top of the glass lid at two places with fixing fasteners. The SUS stirring blade was connected to a powerful stirring motor, and the entire container was securely fixed to a support to prevent loosening of the fixing during grinding. Subsequently, one of the silicone rubber caps in the four-necked separable flask was opened, and a funnel was inserted from the opening. While the stirring motor was rotated at a low speed of approximately 200 to 300 rpm and stirring was performed, a mixture of 8 parts by mass of the polymer aqueous solution and 46 parts by mass of pure water having an effective component value adjusted to 10% (diluted with water or condensed), and 500 parts by mass of 2 mm ceramic beads were sequentially added from the funnel little by little. After all of these were added, the spinning speed was raised to 1000 rpm in a stroke. The state of the beads was checked, and the spinning speed was further raised to 1500 rpm. 40 minutes later from the start of grinding, 4 parts by mass of a 10% polymer aqueous solution was added. Further, 2 parts by mass of the 10% polymer aqueous solution was added after 70 minutes, and another 2 parts by mass thereof was added after 90 minutes. In this state, grinding was continued until not less than 90% of the particle had the particle size of not more than 2 μm. Finally, 0.80% by mass of the polymer was added based on heavy calcium carbonate. After grinding, a product in the flask was separated from the ceramics, and recovered to obtain an inorganic particle dispersion.

The viscosity of the inorganic particle dispersion was evaluated by the method above. The viscosity of the inorganic particle dispersion was 750 mPa·s after one hour from the end of grinding, and 1430 mPa·s after one week.

Example 2

An aqueous solution (2) containing a polyacrylic acid (salt) having a neutralization rate of 97.3% was obtained in the same manner as in Example 1 except that the polymerization condition was changed to that in the process shown in Table 1. In the obtained polymer aqueous solution (2), the solid content value was 43.5%, the effective component value was 41.2%, and the pH was 7.1. The polyacrylic acid (salt) had the weight average molecular weight (Mw) of 5800, and the weight average molecular weight (Mw)/number average molecular weight (Mn) of 2.20. In the polymer aqueous solution (2), the total concentration of the inorganic anion (mainly the sulfuric acid ion and the hypophosphorous acid ion were detected) was 3200 ppm (of which the concentration of the inorganic anion including a phosphorus atom was 2000 ppm).

An inorganic particle dispersion was obtained in the same manner as in Example 1, and the viscosity was evaluated by the method above. The viscosity was 710 mPa·s immediately after grinding, and 1220 mPa·s after one week.

Example 3

An aqueous solution (3) containing a polyacrylic acid (salt) having a neutralization rate of 25.8% was obtained in the same manner as in Example 1 except that the polymerization condition was changed to that in the process shown in Table 1. In the obtained polymer aqueous solution (3), the solid content value was 50.2%, the effective component value was 56.4%, and the pH was 4.0. The polyacrylic acid (salt) had the weight average molecular weight (Mw) of 5500, and the weight average molecular weight (Mw)/number average molecular weight (Mn) of 2.15. In the polymer aqueous solution (3), the total concentration of the inorganic anion (mainly the sulfuric acid ion and the hypophosphorous acid ion were detected) was 4600 ppm (of which the concentration of the inorganic anion including a phosphorus atom was 2900 ppm).

An inorganic particle dispersion was obtained in the same manner as in Example 1, and the viscosity was evaluated by the method above. The viscosity was 510 mPa·s immediately after grinding, and 820 mPa·s after one week.

Example 4

An aqueous solution (4) containing a polyacrylic acid (salt) having a neutralization rate of 98% was obtained in the same manner as in Example 1 except that the polymerization condition was changed to that in the process shown in Table 1. In the obtained polymer aqueous solution (4), the solid content value was 42.1%, the effective component value was 40.1%, and the pH was 6.9. The polyacrylic acid (salt) had the weight average molecular weight (Mw) of 6100, and the weight average molecular weight (Mw)/number average molecular weight (Mn) of 2.10. In the polymer aqueous solution (4), the total concentration of the inorganic anion (mainly the sulfuric acid ion and the hypophosphorous acid ion were detected) was 3000 ppm (of which the concentration of the inorganic anion including a phosphorus atom was 1700 ppm).

An inorganic particle dispersion was obtained in the same manner as in Example 1, and the viscosity was evaluated by the method above. The viscosity was 680 mPa·s immediately after grinding, and 1150 mPa·s after one week.

Comparative Example 1

A comparative aqueous solution (1) containing a polyacrylic acid (salt) having a neutralization rate of 95.8% was obtained in the same manner as in Example 1 except that the polymerization condition was changed to that in the process shown in Table 1. In the obtained comparative aqueous solution (1), the solid content value was 43.0%, the effective component value was 39.7%, and the pH was 6.8. The polyacrylic acid (salt) had the weight average molecular weight (Mw) of 4300, and the weight average molecular weight (Mw)/number average molecular weight (Mn) of 2.39. In the comparative aqueous solution (1), the total concentration of the inorganic anion (mainly the sulfuric acid ion and the hypophosphorous acid ion were detected) was 6700 ppm (of which the concentration of the inorganic anion including a phosphorus atom was 5300 ppm).

An inorganic particle dispersion was obtained in the same manner as in Example 1, and the viscosity was evaluated by the method above. The viscosity was 1120 mPa·s immediately after grinding, and 3870 mPa·s after one week.

The results of the analysis of the polymerization formulas and polymers are summarized in Table 1.

In Table 1, "80% AA" represents the 80% by mass aqueous acrylic acid solution, "15% NaPS" represents the 15% by mass aqueous sodium persulfate solution, and "37.4% SHP" represents the 37.4% by mass aqueous sodium hypophosphite solution. "37.4% SHP (1), (2)" represents the 37.4% SHP divided into two and added. "48% aqueous NaOH solution" represents the 48% aqueous sodium hydroxide solution.

TABLE 1

| | | | Example 1 | Example 1 | Example 3 | Example 4 | Comparative Example 1 |
|---|---|---|---|---|---|---|---|
| Initial charge | | | | | | | |
| | Water | (Parts by weight) | 146.8 | 146.8 | 345.0 | 350.0 | 361.8 |
| Dropping charge | | | | | | | |
| | 80% AA | (Parts by weight) | 383.1 | 383.1 | 900 | 900 | 925 |
| | 37.4% SHP(1) | (Parts by weight) | 36.1 | 7.2 | 17.5 | 8.0 | 119 |
| | 37.4% SHP(2) | (Parts by weight) | | 28.9 | 69.7 | 67.0 | |
| | 15% NaPS | (Parts by weight) | 20.2 | 20.2 | 48.9 | 48.0 | 48.9 |
| | 48% aqueous NaOH solution | (Parts by weight) | | | | 810 | |
| Dropping time | | | | | | | |
| | 80% AA | (min.) | 0-180 | 0-180 | 0-180 | 0-180 | 0-180 |
| | 37.4% SHP(1) | (min.) | 0-180 | 0-20 | 0-20 | 0-20 | 0-180 |
| | 37.4% SHP(2) | (min.) | | 20-180 | 20-180 | 20-180 | |
| | 15% NaPS | (min.) | 0-185 | 0-185 | 0-185 | 0-185 | 0-185 |
| | 48% aqueous NaOH solution | (min.) | | | | 0-180 | |
| Polymerization/Aging temperature | | | Boiling point | Boiling point | Boiling point | Boiling point | Boiling point |
| Aging time | | (min.) | 30 | 30 | 30 | 30 | 30 |
| Content of phosphorous acid (salt) based on 100% by mass of phosphorus compound | | (ppm, in terms of sodium salt) | 2800 | 2200 | 1500 | 2000 | 9100 |
| Post treatment | | | | | | | |
| | 48% aqueous NaOH solution | (Parts by weight) | 345 | 345 | 215 | 7 | 820 |
| | Water | (Parts by weight) | 69.3 | 70.0 | 80.0 | 200 | 185 |
| | NaOH neutralization rate | (%) | 97.1 | 97.3 | 25.8 | 98.0 | 95.8 |
| Analysis | | | | | | | |
| | Residual AA | (ppm) | <100 | <100 | <100 | <100 | <100 |
| | Solid content value | (%) | 43.2 | 43.5 | 50.2 | 42.1 | 43.0 |
| | Effective component value | (%) | 40.6 | 41.2 | 56.4 | 40.1 | 39.7 |
| | pH | | 6.9 | 7.1 | 4.0 | 6.9 | 6.8 |
| | Mw | | 5900 | 5800 | 5500 | 6100 | 4300 |
| | Mw/Mn | | 2.19 | 2.20 | 2.15 | 2.10 | 2.39 |
| | Inorganic anion | (ppm) | 3200 | 3200 | 4600 | 3000 | 6700 |

The results of evaluation of the inorganic particle dispersion according to the present invention are shown in Table 2.

TABLE 2

| | | | Example 1 | Example 2 | Example 3 | Example 4 | Comparative Example 1 |
|---|---|---|---|---|---|---|---|
| Viscosity of inorganic particle dispersion | (Immediate after) | (mPa·s) | 750 | 710 | 510 | 680 | 1120 |
| | (After one week) | (mPa·s) | 1430 | 1220 | 820 | 1150 | 3870 |

TABLE 2-continued

|  |  | Example 1 | Example 2 | Example 3 | Example 4 | Comparative Example 1 |
|---|---|---|---|---|---|---|
| Amount of inorganic particles in inorganic particle dispersion | (% by weight) | 76.9 | 76.9 | 76.9 | 76.9 | 76.9 |
| Concentration of inorganic anion in inorganic particle dispersion | (ppm) | 350 | 351 | 311 | 352 | 470 |

Apparently from the results shown in Table 2, the polymer aqueous solution according to the present invention has higher dispersibility at an initial stage and dispersibility more stable over time than those of the conventional polymer.

As above, it is thought that use of the aqueous poly(meth) acrylic acid (salt) solution according to the present invention provides the same mechanism of action to attain high dispersibility of inorganic substances and demonstrate sufficient dispersibility having stability over time if the aqueous poly (meth)acrylic acid (salt) solution contains a poly(meth) acrylic acid (salt) having a weight average molecular weight of 1000 to 10000 polymerized in the presence of a phosphorus compound containing hypophosphorous acid (salt), the phosphorus compound contains 0 to 0.3% by mass of a phosphorous acid (salt) based on 100% by mass of the phosphorus compound, and the aqueous poly(meth)acrylic acid (salt) solution contains 0 to 10000 ppm of the inorganic anion.

From the results in Examples, it is concluded that the present invention can be used in the entire technical scope of the present invention and in various forms disclosed herein, and demonstrate advantageous effects of action.

The invention claimed is:

1. An aqueous poly(meth)acrylic acid and/or salt thereof solution comprising a poly(meth)acrylic acid and/or salt thereof having a weight average molecular weight of 1000 to 10000 polymerized in the presence of a phosphorus compound containing a hypophosphorous acid and/or salt thereof,
    wherein the phosphorus compound contains a phosphorous acid and/or salt thereof and a total amount of the phosphorous acid and salt thereof is greater than 0% by mass to 0.3% by mass based on 100% by mass of the phosphorus compound, and
    the aqueous poly(meth)acrylic acid and/or salt thereof solution contains 0 to 10000 ppm of an inorganic anion.

2. A process for preparing an aqueous poly(meth)acrylic acid and/or salt thereof solution comprising the step of polymerizing a monomer in an aqueous solvent in the presence of a phosphorus compound containing a hypophosphorous acid and/or salt thereof,
    wherein the monomer contains a (meth)acrylic acid and/or salt thereof as an essential component,
    the phosphorus compound contains a phosphorous acid and/or salt thereof and a total amount of the phosphorous acid and salt thereof is greater than 0% by mass to 0.3% by mass based on 100% by mass of the phosphorus compound,
    the poly(meth)acrylic acid and/or salt thereof has a weight average molecular weight of 1000 to 10000, and
    the aqueous poly(meth)acrylic acid and/or salt thereof solution contains 0 to 10000 ppm of an inorganic anion.

3. A dispersant comprising an aqueous poly(meth)acrylic acid and/or salt thereof solution containing a poly(meth) acrylic acid and/or salt thereof having a weight average molecular weight of 1000 to 10000 polymerized in the presence of a phosphorus compound containing a hypophosphorous acid and/or salt thereof,
    wherein the phosphorus compound contains a phosphorous acid and/or salt thereof and a total amount of the phosphorous acid and salt thereof is greater than 0% by mass to 0.3% by mass based on 100% by mass of the phosphorus compound, and
    the aqueous poly(meth)acrylic acid and/or salt thereof solution contains 0 to 10000 ppm of an inorganic anion.

4. An inorganic particle dispersion containing not less than 70% by mass of an inorganic particle, and prepared by a process comprising the step of adding an aqueous poly(meth) acrylic acid and/or salt thereof solution and grinding the inorganic particle,
    wherein the aqueous poly(meth)acrylic acid and/or salt thereof solution contains a poly(meth)acrylic acid and/or salt thereof having a weight average molecular weight of 1000 to 10000 polymerized in the presence of a phosphorus compound containing a hypophosphorous acid and/or salt thereof; the phosphorus compound contains a phosphorous acid and/or salt thereof and a total amount of the phosphorous acid and salt thereof is greater than 0% by mass to 0.3% by mass based on 100% by mass of the phosphorus compound; and the aqueous poly(meth) acrylic acid and/or salt thereof solution contains 0 to 10000 ppm of an inorganic anion.

5. The aqueous poly(meth)acrylic acid and/or salt thereof solution according to claim 1, wherein the poly(meth)acrylic acid and/or salt thereof comprises not less than 90% by mass and not more than 100% by mass of a structure derived from a (meth)acrylic acid and/or salt thereof, wherein a mass of the (meth)acrylic acid salt is calculated as the corresponding acid.

6. The aqueous poly(meth)acrylic acid and/or salt thereof solution according to claim 1, wherein a molar proportion of a structure derived from a (meth)acrylic acid is 1 to 90 mol % based on 100 mol % of the structures derived from all monomers contained in the poly(meth)acrylic acid and/or salt thereof.

7. The aqueous poly(meth)acrylic acid and/or salt thereof solution according to claim 1, wherein a molar proportion of a structure derived from a (meth)acrylic acid salt is 10 to 99 mol % based on 100 mol % of the structures derived from all monomers contained in the poly(meth)acrylic acid and/or salt thereof.

8. The aqueous poly(meth)acrylic acid and/or salt thereof solution according to claim 1, wherein the poly(meth)acrylic acid and/or salt thereof contains 1 to 10% by mass of a phosphorus-containing group based on 100% by mass of the poly(meth)acrylic acid and/or salt thereof, wherein a mass of a salt of the phosphorous-containing group is calculated as the corresponding acid.

9. The aqueous poly(meth)acrylic acid and/or salt thereof solution according to claim 1, wherein the aqueous poly (meth)acrylic acid and/or salt thereof solution contains 0 to 6000 ppm of an inorganic anion including a phosphorus atom.

10. The aqueous poly(meth)acrylic acid and/or salt thereof solution according to claim 1, which comprises unreacted monomers, wherein a content of the unreacted monomers is less than 1% by mass based on 100% by mass of a solid content in the aqueous poly(meth)acrylic acid and/or salt thereof solution.

11. The aqueous poly(meth)acrylic acid and/or salt thereof solution according to claim 1, which has an APHA color value of not more than 300.

* * * * *